US011544674B2

(12) United States Patent
Little et al.

(10) Patent No.: US 11,544,674 B2
(45) Date of Patent: Jan. 3, 2023

(54) SYSTEM, METHOD, AND NON-TRANSITORY COMPUTER-READABLE STORAGE MEDIA FOR GENERATING DATA FOR USE IN CASINO PROPERTY MANAGEMENT COMPUTER SYSTEMS

(71) Applicant: Station Casinos LLC, Las Vegas, NV (US)

(72) Inventors: William Chad Little, Las Vegas, NV (US); Jon Von Tobel, Las Vegas, NV (US)

(73) Assignee: Station Casinos LLC, Las Vegas, NV (US)

( * ) Notice: Subject to any disclaimer, the term of this patent is extended or adjusted under 35 U.S.C. 154(b) by 130 days.

(21) Appl. No.: 16/811,427

(22) Filed: Mar. 6, 2020

(65) Prior Publication Data
US 2021/0279691 A1    Sep. 9, 2021

(51) Int. Cl.
*G06Q 30/00*    (2012.01)
*G06Q 10/10*    (2012.01)
(Continued)

(52) U.S. Cl.
CPC ..... *G06Q 10/1093* (2013.01); *G06F 16/2379* (2019.01); *G06Q 30/0236* (2013.01);
(Continued)

(58) Field of Classification Search
None
See application file for complete search history.

(56) References Cited

U.S. PATENT DOCUMENTS

| 6,575,832 B1* | 6/2003 | Manfredi | G07F 17/32 |
| | | | 463/25 |
| 7,744,468 B2* | 6/2010 | Boyd | G07F 17/3227 |
| | | | 463/42 |

(Continued)

FOREIGN PATENT DOCUMENTS

| JP | 2016095721 A * | 5/2016 | G06Q 20/06 |
| WO | WO-2007087391 A3 * | 6/2008 | G06Q 30/0209 |
| WO | WO-2013008101 A2 * | 1/2013 | G07F 17/3244 |

OTHER PUBLICATIONS

Soaring Eagle Casino and Resort. Promotions Calendar. (Sep. 30, 2013). Retrieved online Oct. 8, 2021. https://www.soaringeaglecasino.com/casino/promotions.html (Year: 2013).*

(Continued)

*Primary Examiner* — James A Reagan
(74) *Attorney, Agent, or Firm* — Howard & Howard Attorneys PLLC

(57) ABSTRACT

A networked computer system for generating promotional offers for casino property patrons is described herein. The networked computer system includes a promotions management computer server including a processor programmed to execute an algorithm to display an offer selection screen including an event calendar displaying a period of calendar dates, a period token balance associated with the period of calendar dates including an amount of tokens, and a plurality of promotional offers associated with the casino patron, with each promotional offer being displayed with an associated number of tokens. The processor receives a selection of one of the displayed promotional offers and a calendar date, assigns the selected promotional offer to the selected calendar date, reduces the period token balance by the number of tokens associated with the selected promotional offer, and modifies a patron account file to include the selected promotional offer assigned to the selected calendar date.

20 Claims, 11 Drawing Sheets

(51) Int. Cl.
*G06Q 30/02* (2012.01)
*G06Q 50/34* (2012.01)
*G06F 16/23* (2019.01)
*G06F 3/04847* (2022.01)
*G06F 3/0488* (2022.01)
*G06F 3/04817* (2022.01)

(52) U.S. Cl.
CPC .......... *G06Q 50/34* (2013.01); *G06F 3/0488* (2013.01); *G06F 3/04817* (2013.01); *G06F 3/04847* (2013.01); *G06Q 30/0226* (2013.01)

(56) References Cited

U.S. PATENT DOCUMENTS

| | | | | |
|---|---|---|---|---|
| 7,815,506 | B2 * | 10/2010 | Franklin | G07F 17/3255 463/25 |
| 8,088,001 | B2 * | 1/2012 | Preisach | G07F 17/3279 463/16 |
| 8,425,313 | B2 * | 4/2013 | Nelson | G06Q 30/02 463/29 |
| 8,968,077 | B2 * | 3/2015 | Weber | G07F 17/32 709/217 |
| 9,251,528 | B1 * | 2/2016 | McGhie | G06Q 20/06 |
| 9,317,858 | B2 * | 4/2016 | Preisach | G07F 17/323 |
| 9,685,034 | B2 * | 6/2017 | Weber | H04L 67/20 |
| 9,704,174 | B1 * | 7/2017 | McGhie | G07F 17/3244 |
| 10,169,950 | B2 * | 1/2019 | Little | G07F 17/32 |
| 2004/0127284 | A1 * | 7/2004 | Walker | G07F 17/323 463/30 |
| 2005/0215310 | A1 * | 9/2005 | Boyd | G07F 17/3227 463/20 |
| 2006/0211493 | A1 * | 9/2006 | Walker | G07F 17/3262 463/29 |
| 2008/0167106 | A1 * | 7/2008 | Lutnick | G07F 17/3223 463/16 |
| 2009/0156303 | A1 * | 6/2009 | Kiely | G07F 17/3223 463/29 |
| 2009/0172035 | A1 * | 7/2009 | Lessing | G06Q 30/02 |
| 2010/0041470 | A1 * | 2/2010 | Preisach | G07F 17/3279 463/25 |
| 2010/0105454 | A1 * | 4/2010 | Weber | H04L 67/20 463/1 |
| 2013/0035157 | A1 * | 2/2013 | Weber | G07F 17/323 463/29 |
| 2015/0045116 | A1 * | 2/2015 | Xidos | G06Q 50/34 463/25 |
| 2015/0199876 | A1 * | 7/2015 | Weber | G07F 17/3232 463/25 |
| 2019/0147703 | A1 * | 5/2019 | Malek | G07F 17/3251 463/20 |
| 2022/0005314 | A1 * | 1/2022 | Harmon | G06Q 50/34 |
| 2022/0044199 | A1 * | 2/2022 | Pati | G06N 3/08 |

OTHER PUBLICATIONS

Saganing Eagles Casino. "Saganing Eagles Access Club." (Jun. 2, 2016). Retrieved online Dec. 13, 2022. https://www.saganing-eagleslanding.com/casino/access-club.html (Year: 2016).*

Jamul Casino. "Sweetwater Rewards." (Jun. 19, 2019). Retrieved online Dec. 13, 2022. https://www.jamulcasinosd.com/sweetwater-rewards/ (Year: 2019).*

* cited by examiner

| Promotional Offer Data File | | | | |
|---|---|---|---|---|
| Promotional Offer ID | Offer Type | Token Value | Patron Type | |
| Offer001 | $50 Free Dining | 10 Tokens | PatType001 | High Frequency Player |
| Offer025 | $40 Free Slot Play | 10 Tokens | PatType001 | High Frequency Player |
| Offer030 | 4x Point Multiplier | 15 Tokens | PatType001 | High Frequency Player |
| Offer035 | $100 Spa Credit | 24 Tokens | PatType002 | High Spend Player |
| Offer036 | $100 Free Dining | 20 Tokens | PatType002 | High Spend Player |
| Offer040 | $100 Free Slot Play | 20 Tokens | PatType002 | High Spend Player |
| Offer042 | 8x Point Multiplier | 25 Tokens | PatType002 | High Spend Player |

FIG. 5

Patron Account File

Patron ID: pat0012512012
Patron Type: PatType001
Available Patron Offers: Offer001; Offer025; Offer030

| Assigned Patron Offer | Offer Type | Token Value | Assigned Calendar Date |
|---|---|---|---|
| Offer001 | $50 Free Dining | 10 Tokens | 06.28.2019 |
| Offer001 | $50 Free Dining | 10 Tokens | 06.30.2019 |
| Offer025 | $40 Free Slot Play | 10 Tokens | 07.05.2019 |
| Offer001 | $50 Free Dining | 10 Tokens | 07.07.2019 |
| Offer030 | 4x Point Multiplier | 15 Tokens | 07.08.2019 |

FIG. 6

| Offer Selection Data File | |
|---|---|
| Patron ID _62_ | Patron Offers _52_ |
| pat0012512012 | Offer001; Offer025; Offer030 |
| pat0023562541 | Offer001; Offer025; Offer030 |
| pat0023562541 | Offer035; Offer036; Offer040; Offer042 |
| pat0056984565 | Offer001; Offer025; Offer030 |
| pat0065254754 | Offer035; Offer036; Offer040; Offer042 |

FIG. 7

SYSTEM, METHOD, AND NON-TRANSITORY COMPUTER-READABLE STORAGE MEDIA FOR GENERATING DATA FOR USE IN CASINO PROPERTY MANAGEMENT COMPUTER SYSTEMS

FIELD OF THE DISCLOSURE

The present invention relates to networked computer systems for casino property management systems, and more particularly, to systems, methods, and computer-readable storage media that generates data files of promotional offers for casino property patrons.

BACKGROUND

At least some known casino management systems are programmed to monitor casino patron activities and qualify patrons for promotional awards based on the monitored activity to attract and retain patrons at casino properties. In addition, known casino management systems may be programmed to provide promotional awards upon the pre-defined event, such as a time of day, or day of the week. For example, known casino management systems may be programmed to provide a promotional award to each patron playing a qualifying electronic gaming machine at a pre-defined time of day. However, these known systems require a significant use of computing resources at the time of providing the promotional awards. For example, upon detecting the occurrence of the predefined event, the system must dedicate significant computer resources to quickly identify each qualified player, associated a promotional award to the player, and generate and transmit a notification message to the player to notify the players of the awards, which reduces the amount of resources available for other monitoring and reporting activities. As such, these known systems are limited in their ability to allow casino patrons to select and/or schedule promotional awards, and are non-scalable across multiple casino properties.

The present invention is aimed at one or more of the problems identified above.

SUMMARY OF THE INVENTION

In one aspect of the present invention, a networked computer system for generating promotional offers for casino property patrons is provided. The networked computer system includes a plurality of gaming devices and a promotions management computer server coupled to the gaming devices, the promotions management computer server including a processor programmed to execute an algorithm including receiving a request from a casino patron to access a patron account file via a gaming device including a patron ID, retrieving the patron account file associated with the patron ID, and displaying an offer selection screen on the gaming device in response to receiving the request from the casino patron. The processor is programmed to display the offer selection screen including an event calendar displaying a period of calendar dates, a period token balance associated with the period of calendar dates including an amount of tokens, and a plurality of promotional offers associated with the casino patron, with each promotional offer being displayed with an associated number of tokens. The processor receives a selection of one of the displayed promotional offers and a calendar date by the casino patron and assigns the selected promotional offer to the selected calendar date. The processor then reduces the period token balance by the number of tokens associated with the selected promotional offer and displays the reduced period token balance on the offer selection screen. The processor also modifies the patron account file to include the selected promotional offer assigned to the selected calendar date and modifies the event calendar to display an offer icon indicating the selected promotional offer assigned to the selected calendar date.

In another aspect of the present invention, a method of operating a networked computer system for generating promotional offers for casino property patrons is provided. The method includes a processor of a promotions management computer server executing an algorithm to perform the steps of receiving a request from a casino patron to access a patron account file via a gaming device including a patron ID, retrieving the patron account file associated with the patron ID, and displaying an offer selection screen on the gaming device in response to receiving the request from the casino patron. The processor displays the offer selection screen including an event calendar displaying a period of calendar dates, a period token balance associated with the period of calendar dates including an amount of tokens, and a plurality of promotional offers associated with the casino patron, with each promotional offer being displayed with an associated number of tokens. The processor receives a selection of one of the displayed promotional offers and a calendar date by the casino patron and assigns the selected promotional offer to the selected calendar date. The processor then reduces the period token balance by the number of tokens associated with the selected promotional offer and displays the reduced period token balance on the offer selection screen. The processor also modifies the patron account file to include the selected promotional offer assigned to the selected calendar date, and modifies the event calendar to display an offer icon indicating the selected promotional offer assigned to the selected calendar date.

In yet another aspect of the present invention, one or more non-transitory computer-readable storage media, having computer-executable instructions embodied thereon is provided. The computer-executable instructions cause at least one processor to execute an algorithm to receive a request from a casino patron to access a patron account file via a gaming device including a patron ID, retrieve the patron account file associated with the patron ID, and display an offer selection screen on the gaming device in response to receiving the request from the casino patron. The processor displays the offer selection screen including an event calendar displaying a period of calendar dates, a period token balance associated with the period of calendar dates including an amount of tokens, and a plurality of promotional offers associated with the casino patron, with each promotional offer being displayed with an associated number of tokens. The processor receives a selection of one of the displayed promotional offers by the casino patron and a calendar date by the casino patron and assigns the selected promotional offer to the selected calendar date. The processor then reduces the period token balance by the number of tokens associated with the selected promotional offer and displays the reduced period token balance on the offer selection screen. The processor also modifies the patron account file to include the selected promotional offer assigned to the selected calendar date, and modifies the event calendar to display an offer icon indicating the selected promotional offer assigned to the selected calendar date.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein:

FIGS. 5-7 are illustrations of exemplary data files generated by one or more server computers shown in FIGS. 1-2, according to embodiments of the present invention;

Figure 1:
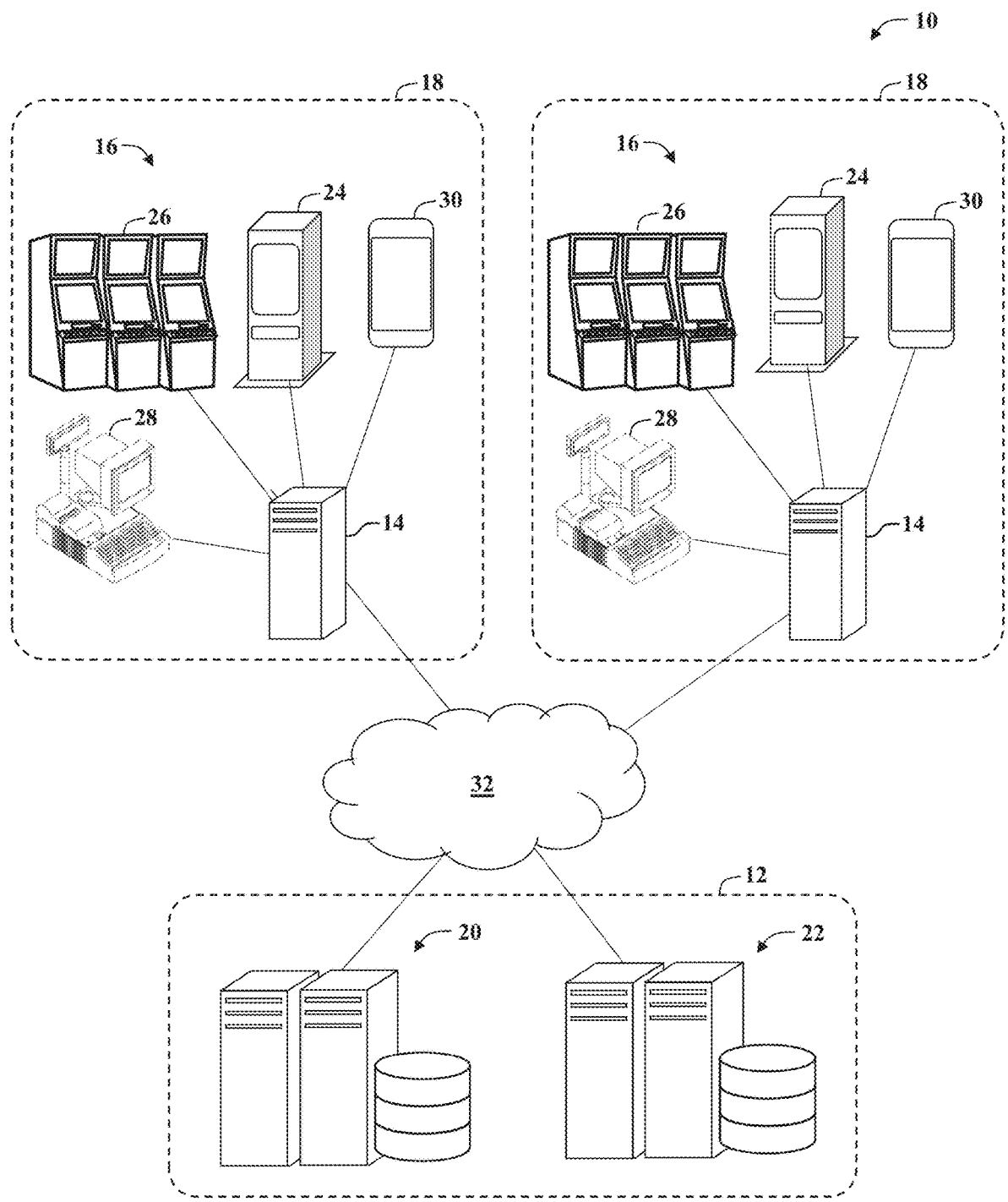
FIG. 1 is a schematic diagram illustrating various aspects of a networked computer system for managing casino properties, according to the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

With reference to the FIGS. and in operation, the present invention provides a networked computer system, methods and computer product media that monitors the activities of casino patrons within multiple physical casino properties to provide promotional offers and provides a graphical user interface that enables patrons to select and schedule activation of promotional offers to be used at casino properties.

Referring to FIG. 1, an exemplary environment in which the networked computer system 10 operates is illustrated. In general, the present invention describes a networked computer system 10 for use in managing patron account data files and promotional offers across multiple casino properties and displaying graphical user interfaces on gaming devices that allows casino patrons to select and schedule activation of promotional offers to be used at casino properties. The promotional offers may include, for example, an amount of gaming credits, free dining credits, and an incentive point multiplier, and the like. The system assigns a token value to each of the promotional offers that are available to the patron, and provides the casino patron with a limited amount of tokens. For example, the system may assign a predefined number of tokens per week that may be used by the casino patron to select and schedule the promotional offers. In addition, the system may assign a number of tokens to the casino patron based on the patron player rating, frequency of visits to one or more casino properties, and/or average amount of purchases made at the casino properties.

The system then allows the casino patron to use the tokens to select promotional offers and schedule the promotional offers for activation on future dates. The system 10 provides a graphical user interface that enables patrons to access patron data files being stored in the system 10, modify the patron data files to include patron selections of promotional offers, and schedule activation of promotional offers. The system 10 improves existing casino management systems by providing a computer system programmed to execute specific algorithms to display graphical user interfaces on gaming devices that enable casino patrons to access and modify patron records to include patron selected promotional offers, without the need for casino personnel to manually process patron requests. In addition, by limiting the number of tokens assigned to the casino patron, the system 10 enables the casino property to better manage the use of promotional offers by the casino patron. As such, the manpower and costs required to operate existing casino management systems is significantly reduced.

In general, the system 10 is programmed to execute algorithms to implement a patron promotional offers selection and scheduling program that enables patrons to interact with the system 10 to access and modify patron account data files to include scheduled activation of promotional offers that are selected by the casino patron. For example, in one embodiment, the system 10 is programmed to execute the My Play™ Casino Promotional Awards Program offered by Station Casinos™.

For clarity in discussing the various functions of the system 10, multiple computers and/or servers are discussed as performing different functions. These different computers (or servers) may, however, be implemented in multiple different ways such as modules within a single computer, as nodes of a computer system, etc. . . . The functions performed by the system 10 (or nodes or modules) may be centralized or distributed in any suitable manner across the system 10 and its components, regardless of the location of specific hardware.

In the illustrated embodiment, the system 10 includes a promotions management computer server system 12 that is coupled in communication with a plurality of player tracking servers 14 and gaming devices 16 located at a plurality of casino property locations 18. The promotions management computer server system 12 includes a promotions management computer server 20 and a casino management system server 22. The promotions management computer server 20 communicates with the casino management system server 22 and the player tracking servers 14 and executes algorithms to implement a patron promotional offers selection and scheduling program such as, for example, the My Play™ Casino Promotional Awards Program offered by Station Casinos™. Each player tracking server 14 is coupled in communication with a plurality of gaming devices 16 that are located at a corresponding casino property 18 and are accessible by casino patrons to allow casino patrons to interact with the promotions management computer server 20 and the casino management system server 22 to access patron account data files and to purchase goods and services provided by the casino property. Each server may include one or more server computers that each include a processing device that includes a processor that is coupled to a memory device. The processing device executes various programs, and thereby controls components of the server according to user instructions received from the gaming devices 16 and/or other servers. The processing device may include memory, e.g., read only memory (ROM) and random access memory (RAM), storing processor-executable instructions and one or more processors that execute the processor-executable instructions.

In the illustrated embodiment, the plurality of gaming devices 16 includes kiosks 24, electronic gaming machines (EMG) 26, a point-of-sale (POS) terminals 28, and user computing devices 30. The player tracking servers 14 monitor the purchases and activities of patrons and transmits the information to the promotions management computer server 20. The casino management system server 22 generates and maintains patron account records (shown in FIG. 6) associated with each patron that includes information associated with the purchase and activities of patrons being monitored by the player tracking servers 14, which are then used to award promotional points to patrons that may be used to purchase additional goods and services from the casino properties. For example, the player tracking servers 14 are configured to tracking patrons wagering activity and game play on electronic gaming machines, table games and other gaming revenue areas such as, bingo, keno, and sports wagering. In addition, the player tracking servers 14 are configured to monitor patron purchases of casino property services such as restaurant, spa services, merchandise, hotel rooms and amenity services through non-gaming revenue POS terminals 28 and/or kiosks 24. Moreover, the player tracking servers 14 may be configured to monitor patron purchases and activities accessed using user computer software applications such as mobile software applications executed on mobile computing devices and/or websites. In some embodiments, the player tracking servers 14 and/or the casino management system server 22 identifies patrons using patron tracking ID cards and/or a patron identification numbers (PIN) that are linked to the patron account records. The casino management system server 22 tracks the patron's gaming play and may award patron tracking points, bonuses, and other incentives according to established criteria to promote continued patron loyalty. For example, in one embodiment, the casino management system server 22 may be configured to implement the myBoardingPass™ player rewards program offered by Station Casinos™.

The gaming devices 16, casino management system server 22, player tracking servers 14, and promotions management computer server 20 communicate via a communications network 32. The communications network 32 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed.

In the illustrated embodiment, each user computing device 30 includes a display device and a processing device that includes a processor that is coupled to a memory device. The processing device executes various programs, and thereby controls components of the computing device according to user instructions received by the user to enable the user to access and communicate with the system 10 including sending and/or receiving information to and from the system 10 and displaying information received from the system 10 to the user.

For example, in some embodiments, the user computing device 30 may include, but is not limited to, a desktop computer, a laptop or notebook computer, a tablet computer, smartphone/tablet computer hybrid, a personal data assistant, a handheld mobile device including a smartphone, and the like. In addition, the user computing device 30 may include a touchscreen that operates as the display device and the user input device. In the illustrated embodiment, the user computing device 30 includes a web-browser program that is stored in the memory device. When executed by the processor of the user computing device, the web-browser program enables the user computing device to receive software code from the system 10 including, but not limited to HTML, JavaScript, and/or any suitable programming code that enables the user computing device to generate and display a website and/or webpages on the display device of the user computing device.

Similarly, kiosks 24 may include a touchscreen display and processor for executing web-browser programs to receive software code from the system 10 and display a website and/or webpages on the touchscreen display. In addition, the kiosks 24 may also include a card reader device for obtaining patron ID's stored on the physical patron tracking ID cards.

In one embodiment, the user computing device 30 may include a mobile computing device such as, for example, a tablet computer, a smartphone/tablet computer hybrid, a smartphone such as an iPhone™, Samsung Galaxy™, and the like. The mobile computing device includes a processor coupled to a memory device for storing various programs and data for use in operating the mobile computing device. The mobile computing device may also include a touchscreen display unit, one or more video image cameras, one or more speakers, a microphone, at least one input button, and one or more sensors including, but not limited to, a touch ID fingerprint sensor coupled to an input button, a barometer, a three-axis gyro, an accelerometer, proximity sensor, and an ambient light sensor. In addition, the mobile computing device may also include a Wi-Fi antenna, a cellular network antenna, a Bluetooth™ communications device, assisted GPS and GLONASS, a digital compass, and an iBeacon™ microlocation device. The mobile computing device may be programmed to store and execute mobile computer program applications that display graphical user interfaces on the touchscreen display unit that allows the user to access the system 10 to retrieve and store information within the system 10 as well as interact with and operate the system 10. For example, the system 10 may be configured to implement a mobile application such as, for example, the STN™ mobile application offered by Station Casinos™ available in Apple iOS™, Google Android™, and Amazon Kindle™ operating platforms, or on social-media websites such as Facebook™.

In some embodiments, the POS terminal 28 includes a computer processor, a monitor (e.g., a cashier-facing monitor), one or more input devices (e.g., scanners, keyboards, scales, or the like), one or more payment devices (e.g., cash drawers, card readers) for receiving or returning payments, one or more output devices (e.g., customer-facing display monitor, receipt printer), or the like or combinations or sub-combinations thereof, and a near field communication (NFC) device, such as, for example, an NFC dongle. The input devices and payment devices can feed data and commands to computer processor for processing or implementation. For example, a barcode scanner can pass data communicating the identity of one or more items to be purchased, returned, or the like to a computer processor. Similarly, a card reader can pass payment information and/or patron ID information to the computer processor. Similarly, customer-facing display and receipt printer can display or output data or information as instructed by the computer processor.

The electronic gaming machine (EMG) 26 includes a display device and a gaming controller that includes one or more gaming computer processors for generating and displaying a plurality of games on the display device. The gaming computer processor executes a wagering game program that uses a random number generator to randomly generate outcomes of the games, which allows a player to make a wager, play a game, and potentially provide the player an award based on an outcome of the game and a paytable. For example, in some embodiments, the EGM 26 executes a video slot machine that executes a game including a plurality of video reels displaying game symbols. The EGM 26 may also execute de any type of game including, but not limited to, a video slot game, a keno game, a blackjack game, a video poker game, or any type of game which allows a player to make a wager and potentially provide the player an award.

In some embodiments, the EGM 26 includes a user input device that includes a plurality of input buttons and an acceptor device that includes a coin slot and/or a bill acceptor. The acceptor device includes an input and output device that is configured to accept a bill, a ticket, and/or a cash card into the acceptor device to enable an amount of gaming credits associated with a monetary value of the bills, ticket, and/or cash card to be credited to the gaming device. For example, the acceptor device may utilize a cashless wagering system (not shown), such as a ticket in ticket out (TITO) system (not shown). The EGM 26 may also include a player tracking device that communicates with the player tracking server 14. The player tracking device includes a player identification card reader and a display. The player identification card reader is configured to accept a player tracking ID card inserted by the player, and read information contained on the player tracking card to identify the player account information. The player identification card reader may include, but is not limited to, a barcode reader, a magnetic card reader, and/or a radio frequency identification (RFID) card reader. The display device may include a touchscreen panel that includes a keypad to allow the player to enter a unique PIN that is used by the player tracking server 14 to identify the patron and the corresponding patron tracking account. The player tracking device is configured to communicate player account information and gaming activity between the player tracking server 14 and the EGM gaming controller. For example, the player tracking device may be used to track bonus points and/or credits awarded to the player during a gaming session and/or track bonus and/or credits downloaded to the EGM 26 from the player tracking server 14.

Figure 2:
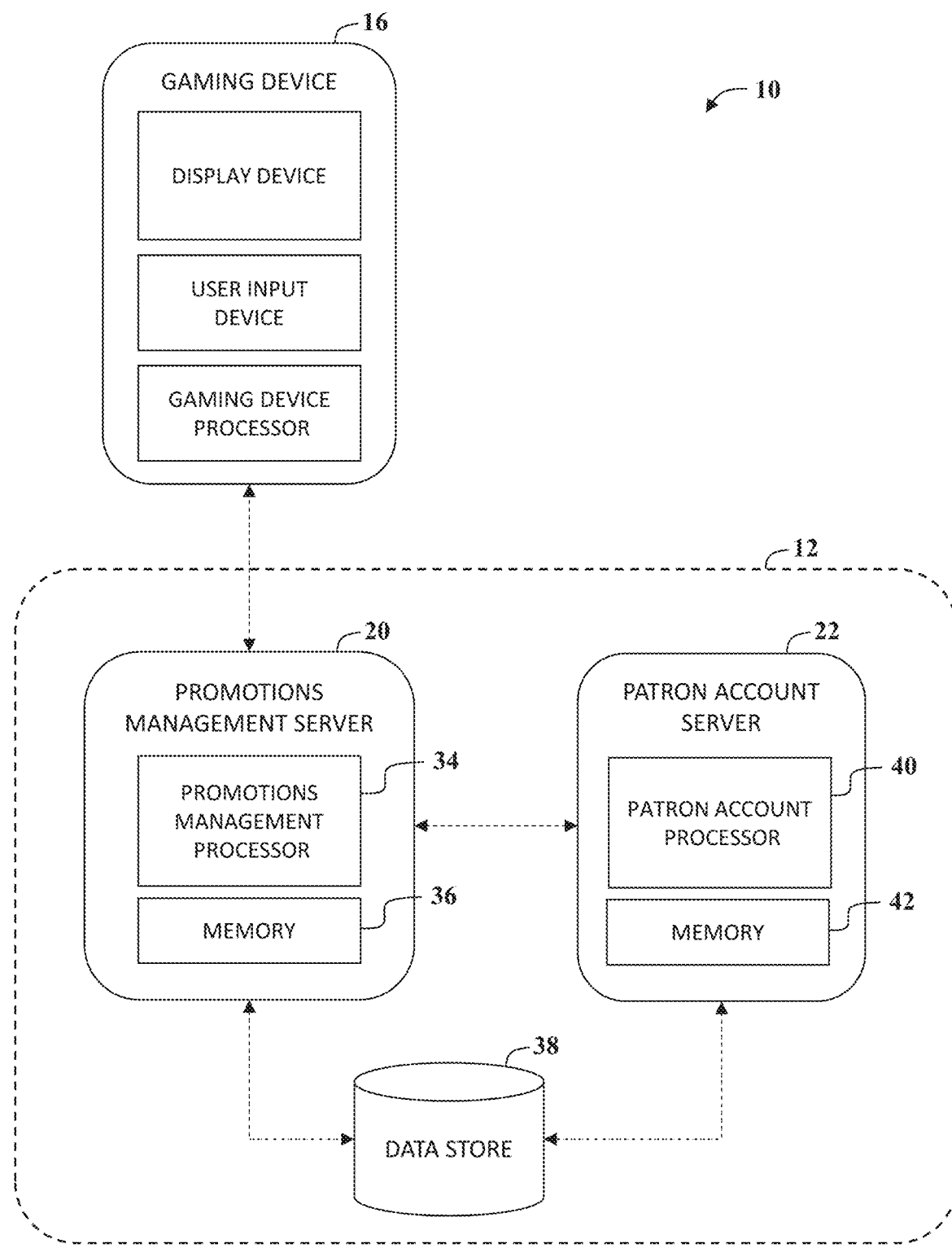
FIG. 2 is a schematic diagram illustrating example components of a server computer system that may be used with the system shown in FIG. 1, according to an embodiment of the present invention.
Figure 3:
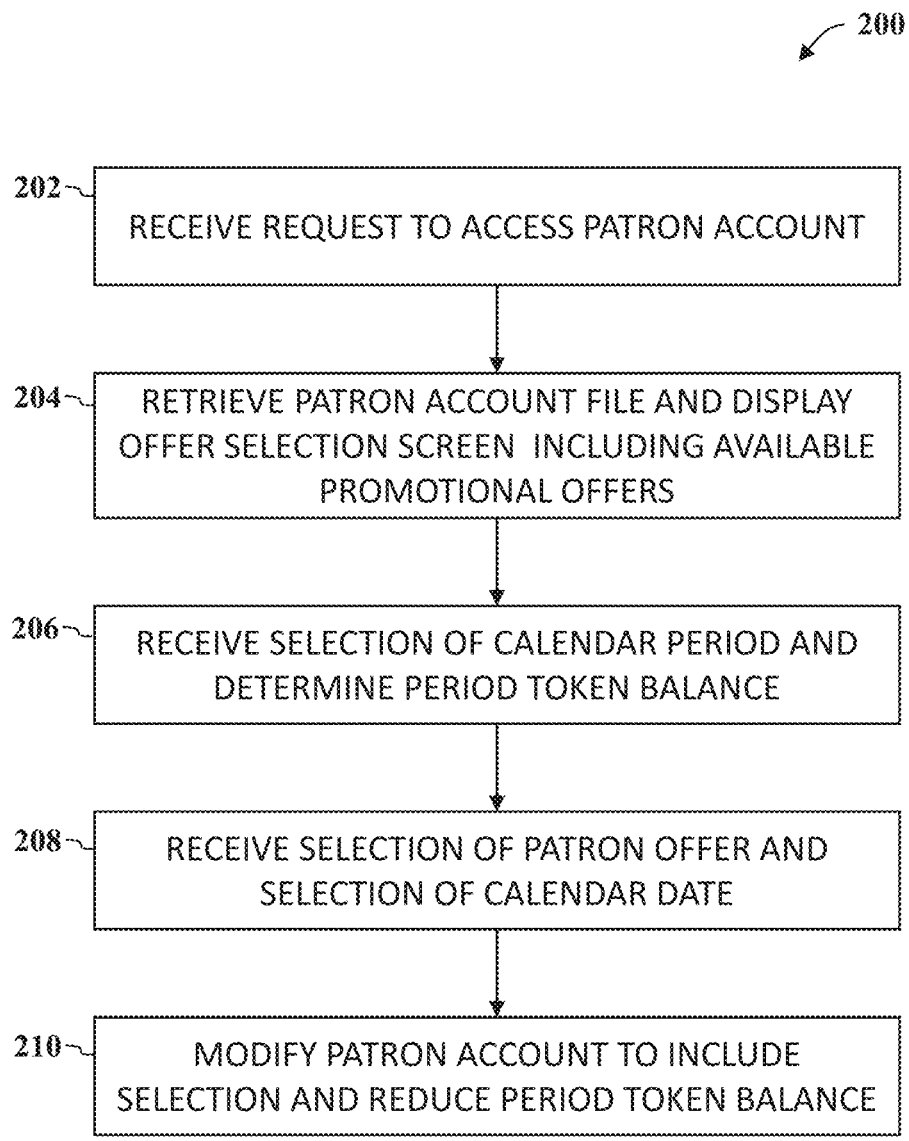
FIGS. 3 and 4 are flowcharts illustrating the algorithms executed by one or more server computers shown in FIGS. 1-2, according to embodiments of the present invention.
Figure 4:
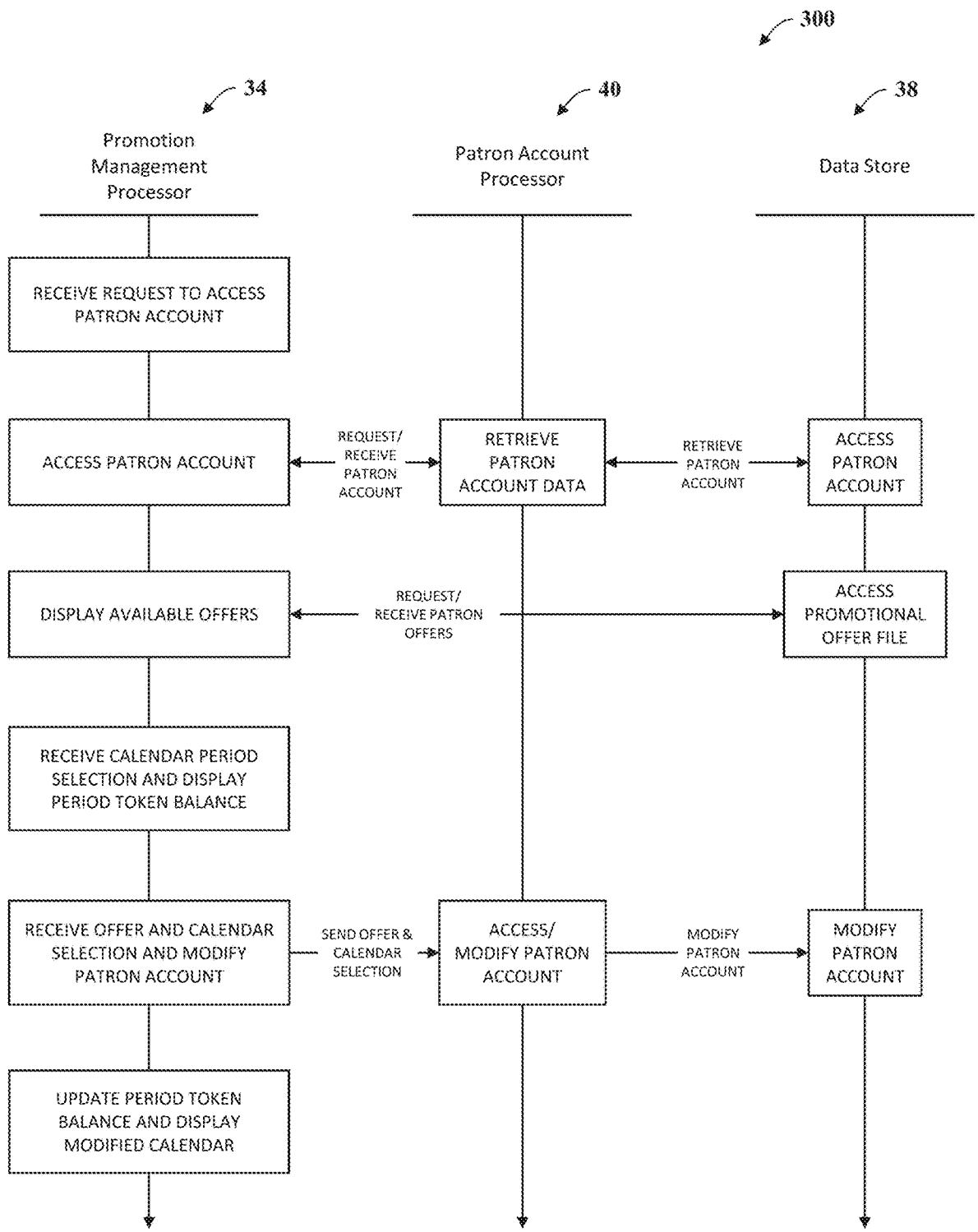
Figure 8:
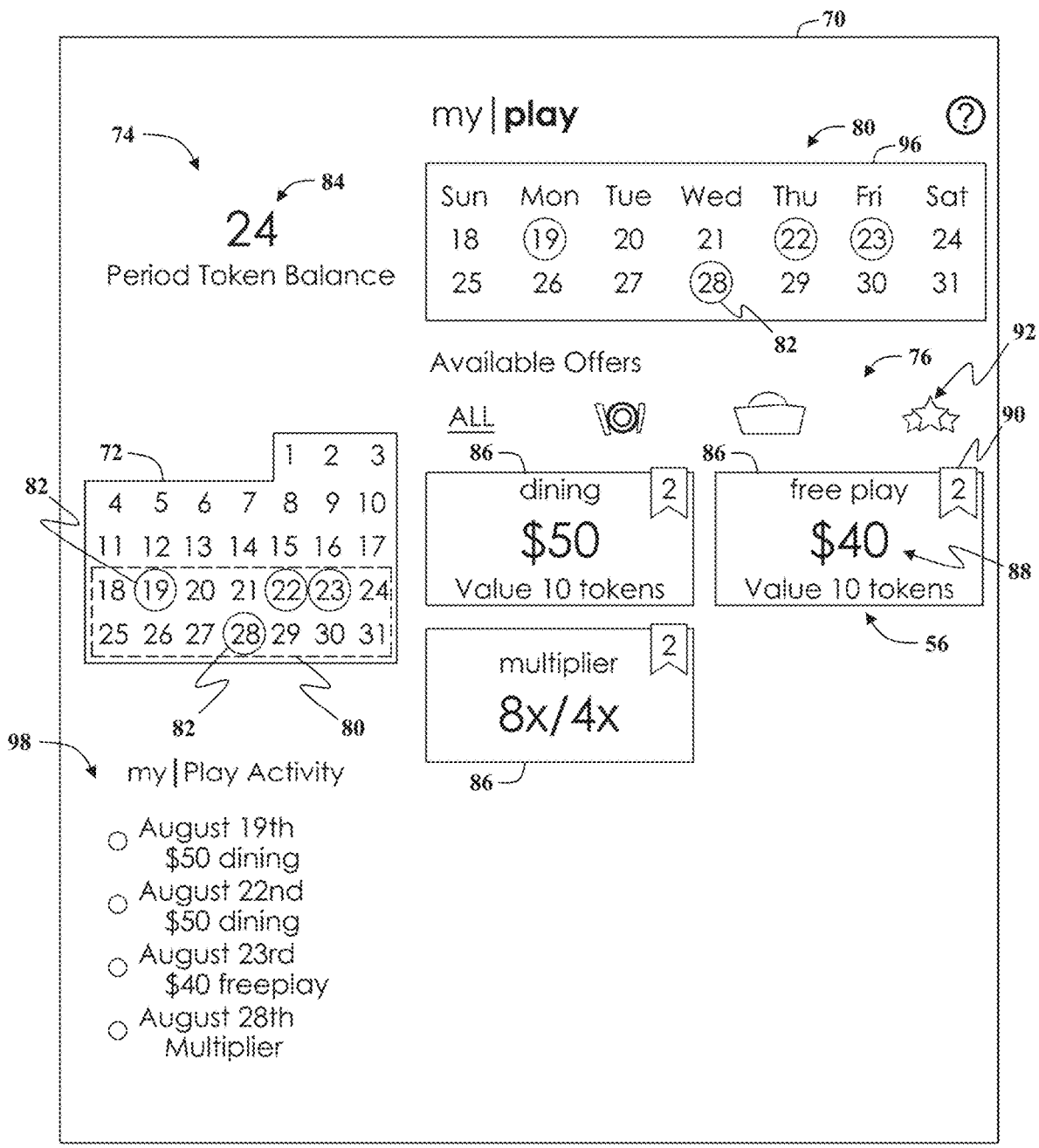
FIG. 8 is an illustrations of an exemplary graphical user interface that may be displayed on a gaming device, according to embodiments of the present invention.

FIG. 2 is a schematic illustrating example components of the promotions management computer server system 12 including the promotions management computer server 20 and the casino management system server 22. FIGS. 3 and 4 are flowcharts illustrating the algorithms 200 and 300 that may be executed by the promotions management computer server 20 and/or the casino management system server 22. FIGS. 8 and 9A-9C are illustrations of graphical computer images that may be displayed on a graphical user interface by the promotions management computer server 20 and/or the casino management system server 22. The methods include a plurality of steps. Each method step may be performed independently of, or in combination with, other method steps. Portions of the methods may be performed by any one of, or any combination of, the components of the system 10. The promotions management computer server 20 and the casino management system server 22 each include one or more processors that are programmed to execute the algorithms shown in FIGS. 3 and 4 and described herein.

For example, in the illustrated embodiment, the promotions management computer server 20 includes a promotion management processor 34 that is coupled to a memory device 36. The promotion management processor 34 communicates with a data store 38 to access and store data files being stored in the data store 38. The casino management system server 22 includes a patron account processor 40 that is coupled to a memory device 42. The patron account processor 40 also communicates with the data store 38 to access and store data files in the data store 38. In addition the promotion management processor 34 communicates with the patron account processor 40 to request and receive patron account information being maintained by the patron account processor 40 and stored in the data store 38. The data store 38 includes a memory device that is connected to a database to retrieve and store information contained in the database. For example, the data store may include data files written in JSON™ programming language.

For example, in one embodiment, the data store 38 maintains a promotional offer data file 44 (shown in FIG. 5), a patron account data file 46 (shown in FIG. 6), and an offer selection data file 48 (shown in FIG. 7). The promotional offer data file 44 includes a plurality of promotional offer records 50 that include information associated with promotional offers that are provided to casino patrons for use in casino properties. For example, in some embodiments, the promotional offers may include, but are not limited to, an amount of gaming credits, free dining credits, and an incentive point multiplier, dining credits including an amount of money that may be used in a casino property restaurant, an amount of gaming credits that may be used at a EGM or gaming table, a promotional point multiplier value that may be to increase an amount of promotional points associated with wagering activities or purchases, a gaming credit multiplier value that may be used to increase gaming credit awards during wagering activity, and/or awards including a payout, in terms of gaming credits or money, other types of awards, including, prizes, e.g., meals, show tickets, etc., as well as in-game awards, such as free games, and/or any suitable promotional offer and/or award that may be provided to casino patrons. Each promotional offer record 50 is associated with a promotional offer and includes information associated with a unique promotional offer ID 52, offer type data 54, a token value 56, and patron type data 58. Each unique promotional offer ID 52 is associated with a corresponding promotional offer. The offer type data 54 includes information about the type of promotional offer such as, for example, an amount of dining credits, an amount of gaming credits, a bonus point multiplier, etc. The token value 56 includes a number of tokens associated with the corresponding promotional offer. The promotional offer data file 44 may include one or more promotional offer records 50 having a token value 56 including a different number of tokens.

The patron type data 58 includes patron classification information associated with a patron's interaction with a casino property. For example, patron classification information may include, but is not limited to, average duration of patron visits to one or more casino properties, frequency of patron visits to one or more casino properties, average wager amount, type of casino games played, average time spent at wagering games, average amount of purchased made at one or more casino properties, average amount of purchases made during visits to casino properties, and the like. For example, patron type data 58 may indicate a high visit frequency player, a low visit frequency player, a high spend player, a low spend player, and/or any other suitable value that may be used to classify casino patrons.

The patron account data file 46 includes a plurality of patron account records 60. Each patron account record 60 includes information associated with a corresponding casino patron. For example, as shown in FIG. 6, in some embodiments, the patron account record 60 may include, but is not limited to including, a unique patron ID 62 associated with a corresponding casino patron, patron type data 58 associated with the casino patron, and one or more promotional offer data records 64. Each promotional offer data record 64 includes information associated with promotional offers that have been assigned to the casino patron. For example, the promotional offer data record 64 may include the unique promotional offer ID 52 associated with the corresponding promotional offer, the offer type data 54, the token value 56, and calendar data 66 indicated the calendar date associated with the promotional offer, that is, the calendar date upon which the promotional offer is active and/or available for use by the patron. Each patron account record 60 may also include personal information associated with the casino patron such as, for example, name, address, email, phone numbers, etc., and wagering and purchase data associated with the casino patron that is collected and monitored by the player tracking servers 14.

The offer selection data file 48 includes information associated with promotional offers assigned and/or available to casino patrons. For example, in some embodiments, the offer selection data file 48 includes a plurality of offer selection records 68. Each offer selection record 68 may include a unique patron ID 62 associated with a corresponding casino patron and promotional offer data that includes one or more unique promotional offer IDs 52 that are each associated with a corresponding promotional offer.

Referring to FIGS. 8 and 9A-9C, in the illustrated embodiment, the promotion management processor 34 is programmed to communicate with the patron account processor 40 and/or the data store 38 to retrieve information associated with casino patrons and generate and display a graphical user interface including an offer selection screen 70 on a display device of a gaming device 16. For example, the promotion management processor 34 may be programmed to generate software code written in HTML, JavaScript, and/or any suitable programming code for use in generating the offer selection screen 70 via webpages being displayed on the gaming devices 16. In the illustrated embodiment, the offer selection screen 70 includes an event calendar 72, a token balance area 74, and a promotional offers area 76.

The event calendar 72 displays consecutive calendar dates that are selectable by the casino patron 78. For example, the event calendar 72 may be displayed with a month of calendar dates and/or a predefined number of consecutive calendar days. The event calendar 72 allows the casino patron to select a period of calendar dates 80. The event calendar 72 may also include one or more offer icons 82 associated with one or more calendar dates to indicate that a promotional offer has been assigned to the corresponding calendar date. Each calendar date displayed in the event calendar 72 is selectable by the casino patron to allow the casino patron to select a period of calendar dates 80 from the displayed calendar dates.

The token balance area 74 displays a period token balance 84 associated with the period of calendar dates 80. The period token balance 84 includes an amount of tokens that are available to the casino patron for use in selecting and assigning promotional offers to calendar dates to schedule the activation and/or availability of the selected promotional offer on a selected calendar date.

The promotional offers area 76 displays a plurality of promotional offers 86 that are associated with the casino patron. Each promotional offer 86 is selectable by the casino patron to allow the casino patron to select a promotional offer 86 for activation. Each of the promotional offers 86 is displayed with an offer type description 88 including information included in the offer type data 54 and the token value 56 including the number of tokens associated with the corresponding promotional offer 86 that are required to select and schedule the corresponding promotional offer 86 for availability and/or activation. By displaying each promotional offer 86 with the associated token value 56, the casino patron is notified on the number of tokens that are required to select the corresponding promotional offer 86. In addition, in some embodiments, the promotional offer 86 may be displayed with selection value 90 indicating the number of times the corresponding promotional offer 86 may be used within the period of calendar dates. For example, in some embodiments, the selection value 90 may indicate the number of times the corresponding promotional offer 86 may be used based on the amount of tokens included in the period token balance 84. The promotional offers area 76 may also include promotion category icons 92 that are selectable by the casino patron and are used to display promotional offers 86 associated with the selected promotion category icons 92 (e.g., dining promotional offers, gaming credit promotional offers, etc.)

Figure 9A:
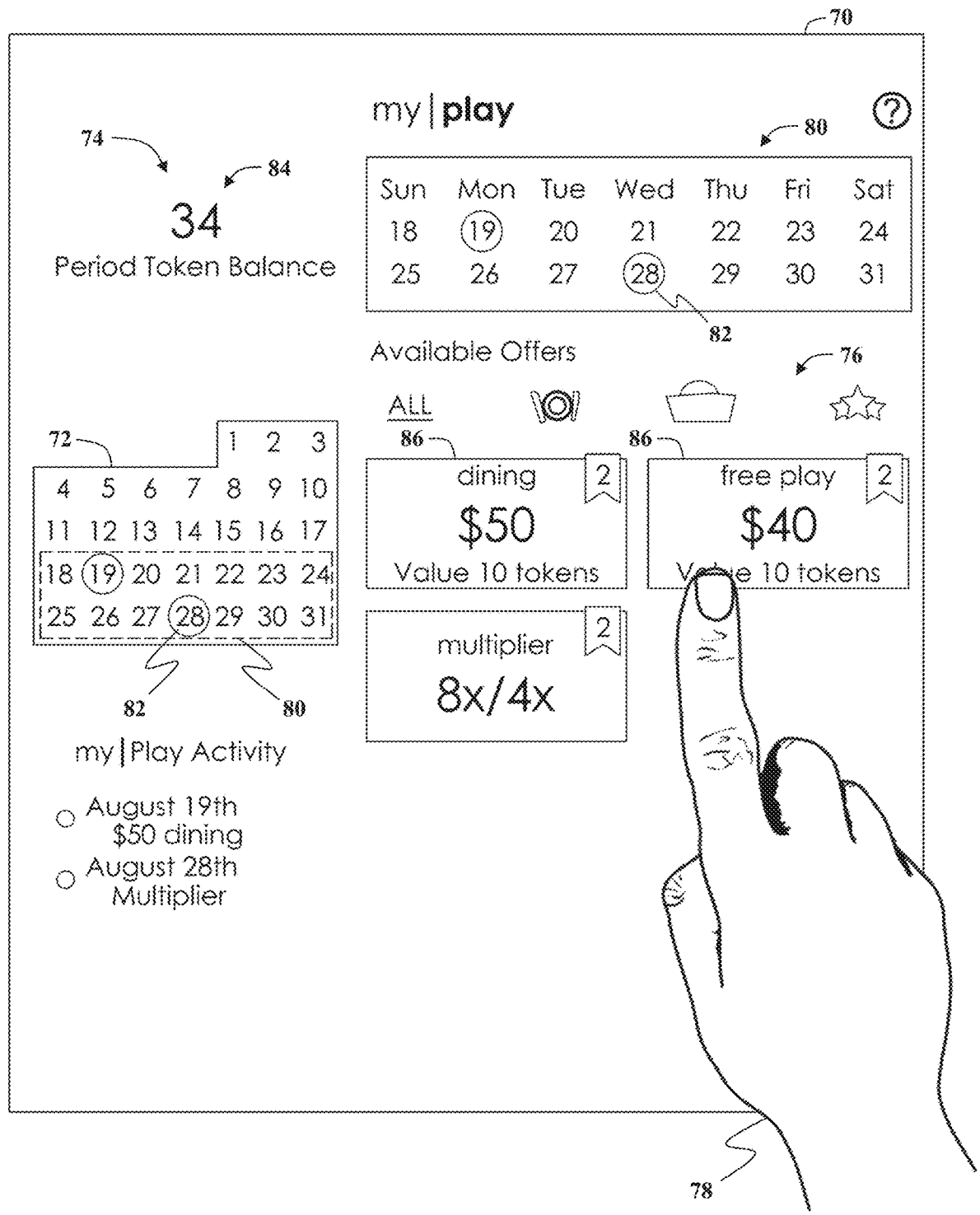
FIGS. 9A-9C are illustrations of a sequence of graphical computer images that may be displayed on the graphical user interface shown in FIG. 8.
Figure 9B:
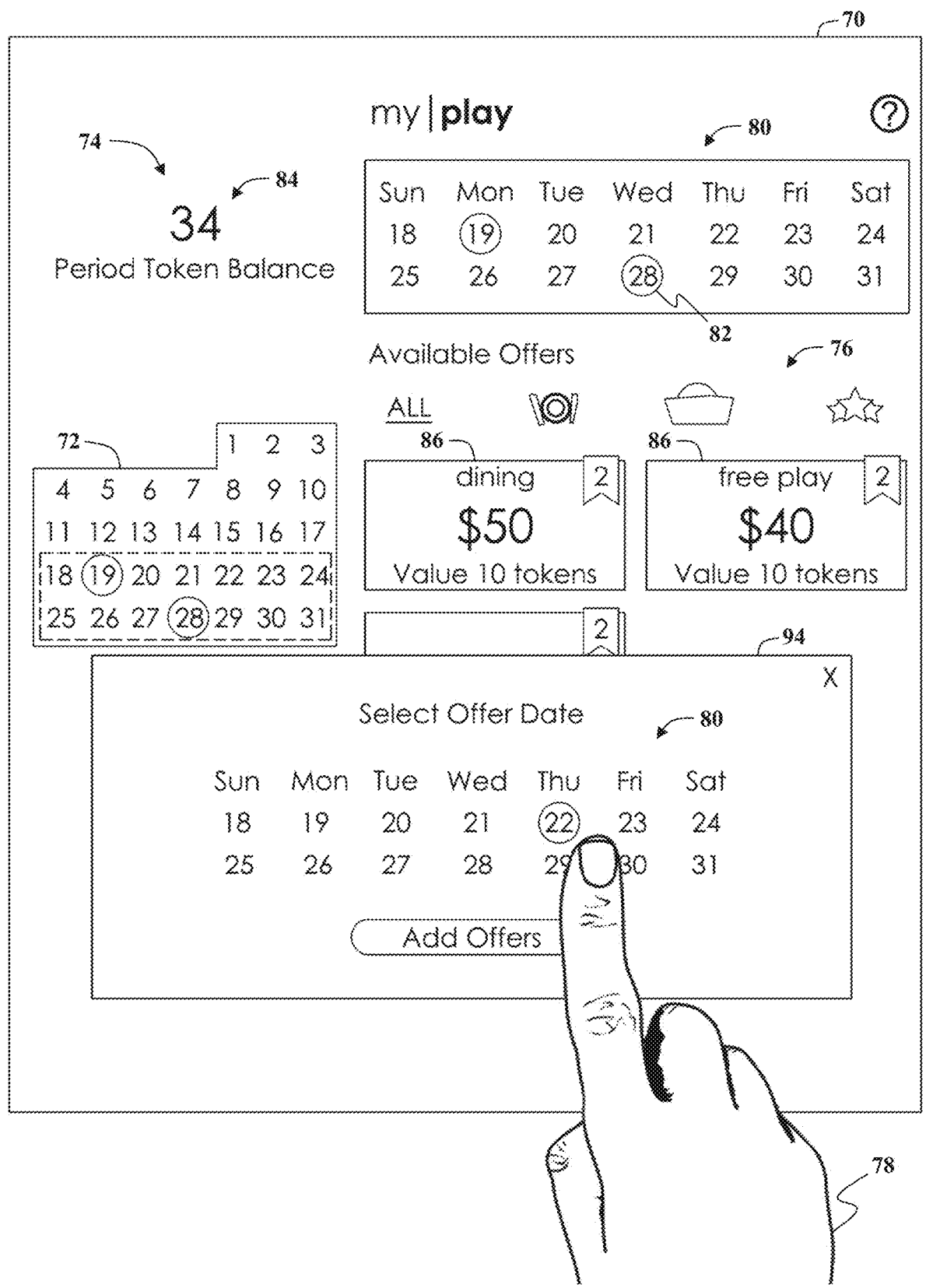
Figure 9C:
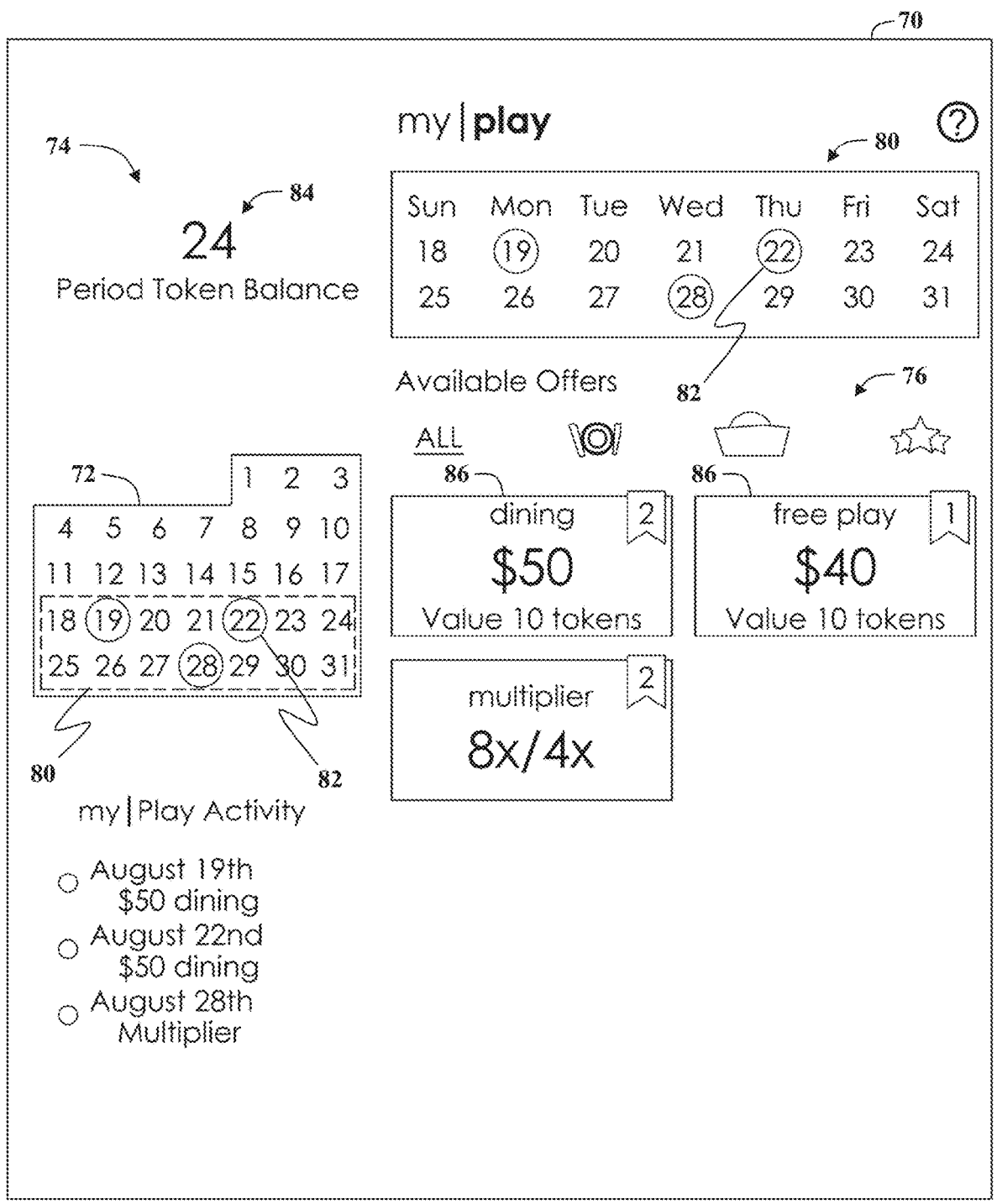

In some embodiments, the offer selection screen 70 may also display a selection calendar 94 (shown in FIG. 9B). For example, the promotion management processor 34 may display the selection calendar 94 in a window upon receiving the casino patron's selection of one of the displayed promotional offers 86. The selection calendar 94 includes a period of calendar dates 80 that are selectable by the casino patron for use in assigning a calendar date to the selected promotional offer 86. The selection calendar 94 may also include offer icons 82 being displayed on each calendar date having an assigned promotional offer 86.

The offer selection screen 70 may also display a status calendar 96 that includes the period of calendar dates that are selected by the casino patron and offer icons displayed on each calendar date having an assigned promotional offer 86 previously selected by the casino patron. In addition, the offer selection screen 70 may also display a schedule promotional offer area 98 displaying a list of upcoming scheduled promotional offers 86 previously selected and scheduled for activation by the casino patron.

Referring to the algorithms 200, 300 illustrated in FIGS. 3 and 4 and graphical user interface FIGS. 8 and 9A-9C, in the illustrated embodiment, in method step 202, the promotion management processor 34 receives a request to access a patron account from a casino patron via a gaming device 16. For example, the promotion management processor 34 may receive a request from a casino patron to access a patron account data file via a gaming device 16 including a patron ID.

In method step 204, in response to receiving the request from the casino patron, the promotion management processor 34 retrieves a patron account data file associated with the casino patron and displays the offer selection screen 70 including promotional offers 86 available to the casino patron. For example, in some embodiments, upon receiving the request from the casino patron, the promotion management processor 34 may transmit the patron ID to the patron account processor 40 including a request to retrieve a patron account data file associated with the patron ID. The patron account processor 40 may then access the patron account data file 46 being stored in the data store 38, retrieve a patron account record 60 matching the patron ID, and transmit the matching patron account record 60 to the promotion management processor 34. Upon receiving the matching patron account record 60, the promotion management processor 34 displays the offer selection screen 70 on the gaming device 16. In the illustrated embodiment, the offer selection screen 70 is displayed with the event calendar 72 displaying a period of calendar dates, the period token balance 84 associated with the period of calendar dates including an amount of tokens, and the plurality of promotional offers 86 associated with the casino patron, with each promotional offer 86 being displayed with an associated number of tokens. In some embodiments, the promotion management processor 34 displays the event calendar 72 to include a month of calendar dates to allow the casino patron to select the period of calendar dates from the displayed calendar dates.

The promotion management processor 34 may also be programmed to initially display the event calendar 72 including a current month. The promotion management processor 34 may then allow the casino patron to scroll or adjust the calendar dates being displayed on the event calendar. In addition, the promotion management processor 34 may also display an offer icon 82 on each calendar date having an assigned promotional offer previously selected by the casino patron.

In one embodiment, the promotion management processor 34 may access the matching patron account record 60 received from the data store 38 and identify the promotional offers included in the matching patron account record 60. For example, the matching patron account record 60 may include one or more promotional offer IDs 52 that are associated with promotional offers that are available to the casino patron. The promotion management processor 34 may identify the promotional offer IDs 52 included in the matching patron account record 60, and transmit a request to the data store 38 to access the promotional offer data file 44 to retrieve promotional offer records 50 associated with the identified promotional offer IDs 52. Upon retrieving the promotional offer records 50 associated with the identified promotional offer IDs 52, the promotion management processor 34 may then access the information included in each retrieved promotional offer records 50 for use in displaying available promotional offers 86 within the promotional offers area 76.

In some embodiments, the promotion management processor 34 may identify the patron type data 58 included in the matching patron account record 60, access the promotional offer data file 44 and identify promotional offer records 50 associated with the identified patron type data 58, and access the information included in the identify promotional offer records 50 for use in displaying available promotional offers 86.

The promotion management processor 34 may also be programmed to access the offer selection data file 48 in the data store 38 and identify promotional offer IDs 52 that are associated with the received patron ID. The promotion management processor 34 may access the promotional offer data file 44 to retrieve promotional offer records 50 matching the identified promotional offer IDs 52, and access the information included in each retrieved promotional offer records 50 for use in displaying available promotional offers 86.

In some embodiments, each available promotional offer 86 may be displayed with the offer type description 88 including information included in the offer type data 54 and the token value 56 including the number of tokens associated with the corresponding promotional offer 86 that are required to select and schedule the corresponding promotional offer 86 for availability and/or activation. The plurality of promotional offers being displayed may also include at least one promotional offer having a different number of tokens.

In one embodiment, the plurality of promotional offers being displayed on the offer selection screen 70 include at least one of an amount of gaming credits, free dining credits, and an incentive point multiplier.

In method step 206, the promotion management processor 34 receives a selection of a calendar period from the casino patron via the event calendar 72, determines a period token balance 84 associated with the selected calendar period, and displays the period token balance 84 on the offer selection screen 70. For example, in some embodiments, the promotion management processor 34 is programmed to access the patron account record 60 and identify promotional offers previously assigned to calendar dates within the period of calendar dates selected by the casino patron. The promotion management processor 34 then determines the token value of each previously assigned promotional offer using the promotional offer records 50 and determines a total number of spent tokens equal to the sum token values of the previously assigned promotional offers within the period of calendar dates selected by the casino patron. The promotion management processor 34 then determines the period token balance 84 by subtracting the determined total number of spent tokens from a baseline token balance.

In some embodiments, the promotion management processor 34 may determine the baseline token balance based on the number of tokens associated with a predefined group of promotional offers. In other embodiments, the promotion management processor 34 may also determine the baseline token balance based on a number of dates within the period of calendar dates selected by the casino patron. For example, each calendar day may be assigned a predefined amount of tokens. The promotion management processor 34 determines the baseline token balance based on the number of the number of calendar days within the period of calendar dates selected by the casino patron, and the predefined amount of tokens assigned to each day. In addition, one or more calendar days may have a different amount of assigned tokens. For example, weekends or holidays may have a lower amount of assigned tokens than weekdays to encourage increased patron visitation during weekdays.

Upon receiving the selection of a calendar period from the casino patron via the event calendar 72, the promotion management processor 34 may then identify each calendar date having an assigned promotional offer. The promotion management processor 34 may then adjust the selection value 90 for each promotional offer being displayed on the offer selection screen 70. For example, for each promotional offer being displayed on the offer selection screen 70, the promotion management processor 34 may be programmed to determine a number of times a corresponding promotional offer may be used within the period of calendar dates based on the number of tokens associated with the corresponding promotional offer and the period token balance 84 and adjust the selection values 90 to display the corresponding promotional offer with the determined number of times the corresponding promotional offer may be used within the period of calendar dates.

In some embodiments, upon receiving the selection of a calendar period from the casino patron via the event calendar 72, the promotion management processor 34 may be programed to display the status calendar 96 on the offer selection screen 70 including the casino patron selected period of calendar dates and an offer icon 82 on each calendar date having an assigned promotional offer previously selected by the casino patron.

In method step 208, the promotion management processor 34 receives a selection of one of the displayed promotional offers by the casino patron and receives a selection of a calendar date by the casino patron to assign the selected promotional offer to the selected calendar date. For example, in one embodiment, the promotion management processor 34 may be programmed to display the selection calendar 94 upon receiving the patron's selection of one of the displayed promotional offers. The selection calendar 94 is displayed with a period of calendar dates included in the calendar period selected by the casino patron via the event calendar 72. The selection calendar 94 may also include the offer icons 82 being displayed on each calendar date having an assigned promotional offer previously selected by the casino patron.

The promotion management processor 34 then receives a selection of a calendar date by the casino patron via the selection calendar 94 and assigns the selected promotional offer to the selected calendar date.

In method step 210, the promotion management processor 34 modifies the patron account record 60 to include the selected promotional offer and assigned calendar date, and reduces the period token balance based on the token value of the selected promotional offer. For example, upon receiving the selection of a calendar date by the casino patron via the selection calendar 94, the promotion management processor 34 assigns the selected promotional offer to the selected calendar date and transmits a patron account modification request to the patron account processor 40 including information indicating the assigned promotional offer and calendar date. The patron account processor 40 then access the patron account record 60 and modifies the patron account data file to include a promotional offer data records 64 including information associated with the selected promotional offer assigned to the selected calendar date.

The promotion management processor 34 then reduces the period token balance 84 by the number of tokens associated with the selected promotional offer and displays the reduced period token balance on the offer selection screen 70. The promotion management processor 34 also modifies the event calendar 72 to display an offer icon 82 indicating the selected promotional offer assigned to the selected calendar date.

In general, the system 10 manages patron account data files and promotional offers across multiple casino properties and displaying graphical user interfaces on gaming devices that allows casino patrons to select and schedule activation of promotional offers to be used at casino properties. The system 10 assigns a token value to each of the promotional offers that are available to the patron, and provides the casino patron with a limited amount of tokens that are be used by the casino patron to select and schedule the promotional offers. The system 10 improves existing casino management systems by providing a computer system programmed to execute specific algorithms to display graphical user interfaces on gaming devices that enable casino patrons to access and modify patron records to include patron selected promotional offers, without the need for casino personnel to manually process patron requests. In addition, by limiting the number of tokens assigned to the casino patron, the system 10 enables the casino property to better manage the use of promotional offers by the casino patron. As such, the manpower and costs required to operate existing casino management systems is significantly reduced.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, MongoDB™ database engines which is a document storage solution, Oracle® Database, MySQL, IBM® Db2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A networked computer system for generating promotional offers for casino property patrons, comprising:
a plurality of user input devices;
a promotions management computer server coupled to the user input device, the promotions management computer server including a processor programmed to execute an algorithm including:
receive a request from a casino patron to display an offer selection screen via at least one of the user input devices, the request including a patron ID;
retrieve a patron account file associated with the patron ID;
access an offer selection data file including a plurality of promotional offers associated with a plurality of patron IDs and identify corresponding promotional offers associated with the received patron ID;
display the offer selection screen on the at least one user input device including an event calendar;
receive a patron selection of a period of calendar dates displayed on the event calendar;
determine a baseline token balance based on a number of dates within the selected period of calendar dates, each calendar day being assigned a predefined amount of tokens;
identify promotional offers previously assigned to calendar dates within the selected period of calendar dates and display offer icons on the event calendar associated with the identified promotional offers previously assigned to calendar dates;
determine a total number of spent tokens associated with the identified promotional offers previously assigned to calendar dates;
determine a period token balance associated with the selected period of calendar dates by subtracting the determined total number of spent tokens from the baseline token balance, the period token balance including an amount of tokens available to select promotional offers to be used during the selected period of calendar dates;
display the determined period token balance associated with the selected period of calendar dates on the offer selection screen;
display a plurality of images of the identified corresponding promotional offers associated with the received patron ID on the offer selection screen, each corresponding promotional offer being displayed with an associated number of tokens;
receive a selection of one of the corresponding promotional offers by the casino patron;
display a selection calendar upon receiving the patron's selection of one of the corresponding promotional offers, the event selection calendar including the period of calendar dates;
receive a selection of a calendar date by the casino patron via the selection calendar and assign the selected corresponding promotional offer to the selected calendar date;
reduce the period token balance by the number of tokens associated with the selected corresponding promotional offer and display the reduced period token balance on the offer selection screen;
modify the patron account file to include the selected corresponding promotional offer assigned to the selected calendar date; and modify the event calendar to display an offer icon indicating the selected corresponding promotional offer assigned to the selected calendar date.

2. The networked computer system of claim 1, wherein the promotions management computer server is programmed to:
the at least one of the user input devices is a kiosk located within a casino property.

3. The networked computer system of claim 1, wherein the promotions management computer server is programmed to:
display the selection calendar including an offer icon being displayed on each calendar date having an assigned corresponding promotional offer previously selected by the casino patron.

4. The networked computer system of claim 1, wherein one or more calendar days included in the selected period of calendar dates includes a different amount of assigned tokens.

5. The networked computer system of claim 4, wherein a weekend day has a lower amount of assigned tokens than a weekday.

6. The networked computer system of claim 1, wherein the promotions management computer server is programmed to:
determine the baseline token balance based on the number of tokens associated with a predefined group of promotional offers.

7. The networked computer system of claim 1, wherein the identified corresponding promotional offers includes at least one promotional offer having a different associated number of tokens.

8. The networked computer system of claim 1, wherein the identified corresponding promotional offers includes at least one of an amount of gaming credits, free dining credits, and an incentive point multiplier.

9. The networked computer system of claim 1, wherein the promotions management computer server is programmed to:
display the event calendar including a month of calendar dates and allow the casino patron to select the period of calendar dates from the displayed month of calendar dates.

10. The networked computer system of claim 1, wherein the promotions management computer server is programmed to:
display a status calendar including the casino patron selected period of calendar dates and an offer icon on each calendar date having an assigned promotional offer previously selected by the casino patron.

11. The networked computer system of claim 1, wherein the promotions management computer server is programmed to:
for each corresponding promotional offer being displayed on the offer selection screen:
determine a number of times the corresponding promotional offer may be used within the period of calendar dates based on the number of tokens associated with the corresponding promotional offer and the period token balance; and
display the corresponding promotional offer with the determined number of times the corresponding promotional offer may be used within the period of calendar dates.

12. A method of operating a networked computer system for generating promotional offers for casino property patrons, the networked computer system including a plurality of user input devices and a promotions management computer server coupled to the plurality of user input devices, the method including a processor of the promotions management computer server executing an algorithm to perform the steps of:
receiving a request from a casino patron to display an offer selection screen via at least one of the user input devices, the request including a patron ID;
retrieving a patron account file associated with the patron ID;
accessing an offer selection data file including a plurality of promotional offers associated with a plurality of patron IDs and identify corresponding promotional offers associated with the received patron ID;
displaying the offer selection screen on the at least one user input device including an event calendar;
receiving a patron selection of a period of calendar dates displayed on the event calendar;
determining a baseline token balance based on a number of dates within the selected period of calendar dates, each calendar day being assigned a predefined amount of tokens;
identifying promotional offers previously assigned to calendar dates within the selected period of calendar dates and displaying offer icons on the event calendar associated with the identified promotional offers previously assigned to calendar dates;
determining a total number of spent tokens associated with the identified promotional offers previously assigned to calendar dates;
determining a period token balance associated with the selected period of calendar dates by subtracting the determined total number of spent tokens from the baseline token balance, the period token balance including an amount of tokens available to select promotional offers to be used during the selected period of calendar dates;
displaying the determined period token balance associated with the selected period of calendar dates on the offer selection screen;
displaying a plurality of images of the identified corresponding promotional offers associated with the retrieved patron ID on the offer selection screen, each corresponding promotional offer being displayed with an associated number of tokens;
receiving a selection of one of the corresponding promotional offers by the casino patron;
displaying a selection calendar upon receiving the patron's selection of one of the corresponding promotional offers, the event selection calendar including the period of calendar dates;
receiving a selection of a calendar date by the casino patron via the selection calendar and assigning the selected corresponding promotional offer to the selected calendar date;
reducing the period token balance by the number of tokens associated with the selected corresponding promotional offer and displaying the reduced period token balance on the offer selection screen;
modifying the patron account file to include the selected corresponding promotional offer assigned to the selected calendar date; and
modifying the event calendar to display an offer icon indicating the selected corresponding promotional offer assigned to the selected calendar date.

13. The method of claim 12, including the processor performing the steps of:

displaying the selection calendar including an offer icon being displayed on each calendar date having an assigned corresponding promotional offer previously selected by the casino patron.

14. The method of claim 12,
wherein one or more calendar days included in the selected period of calendar dates includes a different amount of assigned tokens.

15. The method of claim 14,
wherein a weekend day has a lower amount of assigned tokens than a weekday.

16. The method of claim 12, including the processor performing the step of:
determining the baseline token balance based on the number of tokens associated with a predefined group of promotional offers.

17. The method of claim 12, wherein the identified corresponding promotional offers includes at least one of an amount of gaming credits, free dining credits, and an incentive point multiplier.

18. The method of claim 12, including the processor performing the step of:
displaying a status calendar including the casino patron selected period of calendar dates and an offer icon on each calendar date having an assigned promotional offer previously selected by the casino patron.

19. The method of claim 12, including the processor performing the steps of:
for each promotional offer being displayed on the offer selection screen:
determining a number of times a corresponding promotional offer may be used within the period of calendar dates based on the number of tokens associated with the corresponding promotional offer and the period token balance; and
displaying the corresponding promotional offer with the determined number of times the corresponding promotional offer may be used within the period of calendar dates.

20. One or more non-transitory computer-readable storage media, having computer-executable instructions embodied thereon, wherein when executed by at least one processor, the computer-executable instructions cause the at least one processor to execute an algorithm to:
receive a request from a casino patron to display an offer selection screen via a user input device, the request including a patron ID;
retrieve a patron account file associated with the patron ID;
access an offer selection data file including a plurality of promotional offers associated with a plurality of patron IDs and identify corresponding promotional offers associated with the received patron ID;
display the offer selection screen on the at least one user input device including an event calendar;
receive a patron selection of a period of calendar dates displayed on the event calendar;
determine a baseline token balance based on a number of dates within the selected period of calendar dates, each calendar day being assigned a predefined amount of tokens;
identify promotional offers previously assigned to calendar dates within the selected period of calendar dates and display offer icons on the event calendar associated with the identified promotional offers previously assigned to calendar dates;
determine a total number of spent tokens associated with the identified promotional offers previously assigned to calendar dates;
determine a period token balance associated with the selected period of calendar dates by subtracting the determined total number of spent tokens from the baseline token balance, the period token balance including an amount of tokens available to select promotional offers to be used during the selected period of calendar dates;
display the determined period token balance associated with the selected period of calendar dates on the offer selection screen;
display a plurality of images of the identified corresponding promotional offers associated with the received patron ID on the offer selection screen, each corresponding promotional offer being displayed with an associated number of tokens;
receive a selection of one of the corresponding promotional offers by the casino patron;
display a selection calendar upon receiving the patron's selection of one of the corresponding promotional offers, the event selection calendar including the period of calendar dates;
receive a selection of a calendar date by the casino patron via the selection calendar and assign the selected corresponding promotional offer to the selected calendar date;
reduce the period token balance by the number of tokens associated with the selected corresponding promotional offer and display the reduced period token balance on the offer selection screen;
modify the patron account file to include the selected corresponding promotional offer assigned to the selected calendar date; and
modify the event calendar to display an offer icon indicating the selected corresponding promotional offer assigned to the selected calendar date.

* * * * *